United States Patent
Oyarbide et al.

(10) Patent No.: US 9,631,515 B2
(45) Date of Patent: Apr. 25, 2017

(54) GAS TURBINE WITH HIGH-PRESSURE TURBINE COOLING SYSTEM

(71) Applicant: Rolls-Royce Deutschland Ltd & Co KG, Blankenfelde-Mahlow (DE)

(72) Inventors: Asier Oyarbide, Berlin (DE); Reinhold Hecken, Riesdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 367 days.

(21) Appl. No.: 14/324,621

(22) Filed: Jul. 7, 2014

(65) Prior Publication Data

US 2015/0010385 A1    Jan. 8, 2015

(30) Foreign Application Priority Data

Jul. 8, 2013  (DE) .................. 10 2013 011 350

(51) Int. Cl.
*F01D 11/02* (2006.01)
*F01D 25/12* (2006.01)
(Continued)

(52) U.S. Cl.
CPC ............ *F01D 25/12* (2013.01); *F01D 11/001* (2013.01); *F01D 11/04* (2013.01); *F01D 9/065* (2013.01);
(Continued)

(58) Field of Classification Search
CPC ... F01D 5/18; F01D 5/181; F01D 5/08; F01D 5/081; F01D 5/082; F01D 11/001; F01D 9/065
See application file for complete search history.

(56) References Cited

U.S. PATENT DOCUMENTS 3,945,758 A    3/1976   Lee
4,666,368 A *  5/1987   Hook, Jr. ................ F01D 5/082
                                                          415/115
(Continued)

FOREIGN PATENT DOCUMENTS

DE      10330471      2/2005
EP       2011968 A2   1/2009
WO    2010057182 A1   5/2010

OTHER PUBLICATIONS

German Search Report dated Feb. 11, 2014 from counterpart app No. 10 2013 011 350.4.
(Continued)

*Primary Examiner* — John K Fristoe, Jr.
*Assistant Examiner* — Sabbir Hasan
(74) *Attorney, Agent, or Firm* — Shuttleworth & Ingersoll, PLC; Timothy Klima

(57) ABSTRACT

The present invention relates to a gas turbine with a turbine stator wheel, which is fitted with stator vanes and includes a ring segment-shaped vane root, where the stator vanes are designed hollow and have a vane interior which can be supplied with cooling air, where a ring-shaped sealing element of an inter-stage seal is arranged radially on the inside, relative to an engine axis, on the vane root, where in the vane root at least one outflow duct is provided, characterized in that between the vane root and the sealing element an annular space extending substantially in the axial direction is formed, into which the outflow duct issues and which discharges into the area of the inter-stage seal.

18 Claims, 5 Drawing Sheets

Figure 1:
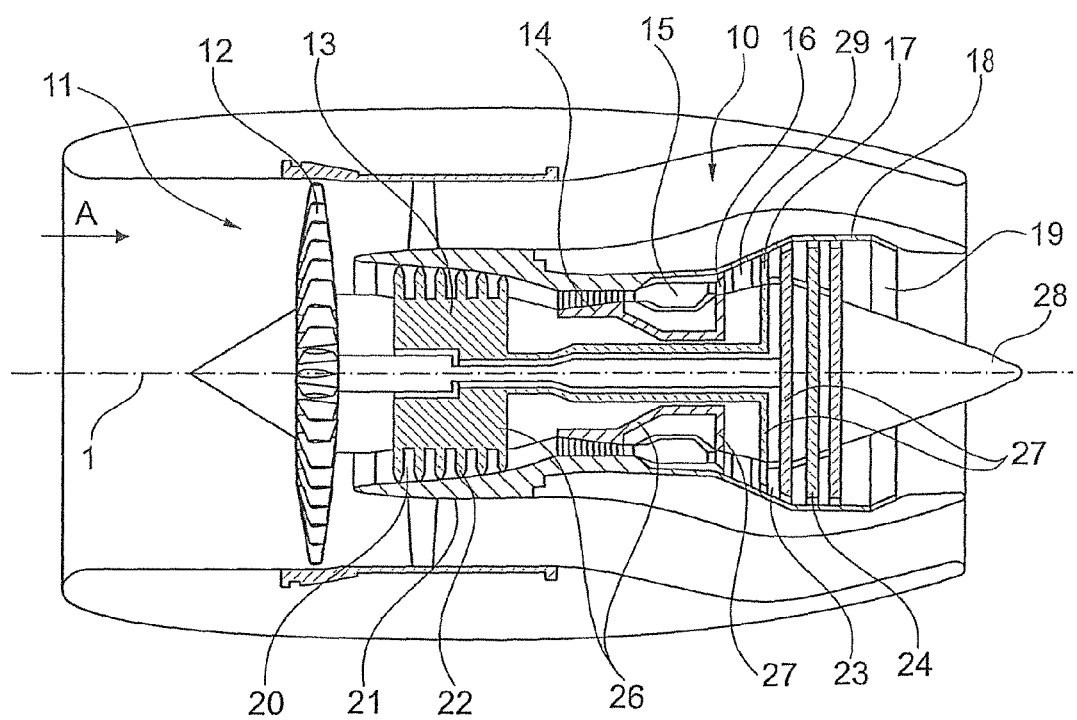

(51) Int. Cl.
*F01D 11/04* (2006.01)
*F01D 11/00* (2006.01)
*F01D 9/06* (2006.01)

(52) U.S. Cl.
CPC ... *F05D 2260/22141* (2013.01); *Y02T 50/676* (2013.01)

(56) References Cited

U.S. PATENT DOCUMENTS

| | | | |
|---|---|---|---|
| 5,488,825 A | 2/1996 | Davis et al. | |
| 5,749,701 A * | 5/1998 | Clarke | F01D 11/001 415/115 |
| 6,357,999 B1 | 3/2002 | Pearce et al. | |
| 6,398,488 B1 | 6/2002 | Solda et al. | |
| 7,137,777 B2 | 11/2006 | Fried et al. | |
| 7,507,069 B2 * | 3/2009 | Kizuka | F01D 5/081 415/199.5 |
| 2006/0034685 A1 | 2/2006 | Kizuka et al. | |
| 2006/0216140 A1 | 9/2006 | Dervaux et al. | |
| 2008/0101927 A1 | 5/2008 | Strain et al. | |
| 2009/0317244 A1 | 12/2009 | Howe et al. | |
| 2013/0156579 A1 | 6/2013 | Lee et al. | |

OTHER PUBLICATIONS

European Search Report dated Jul. 10, 2014 from counterpart application No. 14169860.5.

* cited by examiner

GAS TURBINE WITH HIGH-PRESSURE TURBINE COOLING SYSTEM

This application claims priority to German Patent Application DE102013011350.4 filed Jul. 8, 2013, the entirety of which is incorporated by reference herein.

This invention relates to a gas turbine, in particular to an aircraft gas turbine, which is provided with a high-pressure turbine. A turbine stator wheel, which is fitted with stator vanes and includes a ring segment-shaped vane root, is provided here. The stator vanes are designed hollow and have a vane interior which can be supplied with cooling air. To achieve sealing between the rotor wheels and the stator wheels, an inter-stage seal is provided, including an annular or ring segment-shaped sealing element which is arranged radially on the inside, relative to a machine axis, on the vane root. The vane root has at least one outflow duct, through which cooling air can be passed out of the vane interior to the inter-stage seal.

It is known from the state of the art to guide the cooling air out of the vane interior via tubes or tubular ducts through the vane root into the area of the inter-stage seal. This is shown for example by U.S. Pat. No. 6,357,999 B1. A similar design is already known from US 2006/0216140 A1 Solutions of this kind are complex in design and hence cost-intensive to manufacture. Furthermore, due to the limited cross-sections of the outflow ducts it is not always assured that a sufficient cooling air quantity can be made available.

The object underlying the present invention is to provide a gas turbine having a high-pressure turbine cooling system of the type specified at the beginning, which, while being simply designed and easily and cost-effectively producible, features a high efficiency.

It is a particular object to provide a solution to the above problems by a combination of features described herein. Further advantageous embodiments will become apparent from the present description.

It is thus provided in accordance with the invention that an annular space extending substantially in the axial direction is formed between the vane root and the sealing element. The outflow duct passing through the vane root of the stator vane issues into the annular space, which in turn discharges into the area of the inter-stage seal.

It is thus provided in accordance with the invention that the outflow duct issues directly into an annular space. As a result, a large flow cross-section is possible, so that sufficient cooling air volumes can be passed through. It is furthermore possible to manufacture the annular space simply and cost-effectively, as it can be provided between two adjacent and separate components. This is particularly advantageous and cost-reducing for production reasons in particular. The outflow duct, which is preferably designed nozzle-like, can be manufactured in simple manner by means of a casting method during manufacture of the stator vane segment and/or the vane root segment.

Passing the cooling air out of the vane interior through the nozzle-like outflow duct additionally results in an impingement cooling effect when the cooling air reaches the annular space, which considerably improves the cooling of the inter-stage seal.

In a preferred development of the present invention, it is provided that the annular space has a substantially constant width, which improves the entire flow behaviour. To safeguard the annular space itself in respect of its width and/or its cross-section and to both guide and improve the flow through the annular space, it is particularly advantageous when ribs extending in the flow direction are arranged in the annular space. These can for example be provided on the annular sealing element, for example by a casting method or by machining. The ribs thus act as spacers, to create the annular space and to avoid a direct contact between the sealing element and the vane root. Instead of being formed on the sealing element, the ribs can also be provided on the vane root segment.

The discharge area of the annular space is preferably designed for axial outflow of the cooling air. It is however also possible to design the discharge area such that the outflow takes place at an angle to the axial direction and/or at an angle to the radial direction. To improve the outflow of the cooling air from the annular space, it can be particularly advantageous to provide an annular flow-guiding element at the discharge area. Using the flow-guiding element, the outflow of the cooling air can be designed inclined relative to the radial direction and or the axial direction. The flow element can also be provided with passage ducts which impart a swirl to the exiting cooling air and/or counteract any swirl formation arising from the relative movement between stator and rotor.

With the design in accordance with the invention, it is thus assured that the cooling air is passed out effectively and reproducibly, with impingement cooling effects in particular being achievable. Furthermore it is possible, in particular due to the ribs and the additional flow-guiding element, to suppress any circumferential flow of the cooling air.

Figure 2:
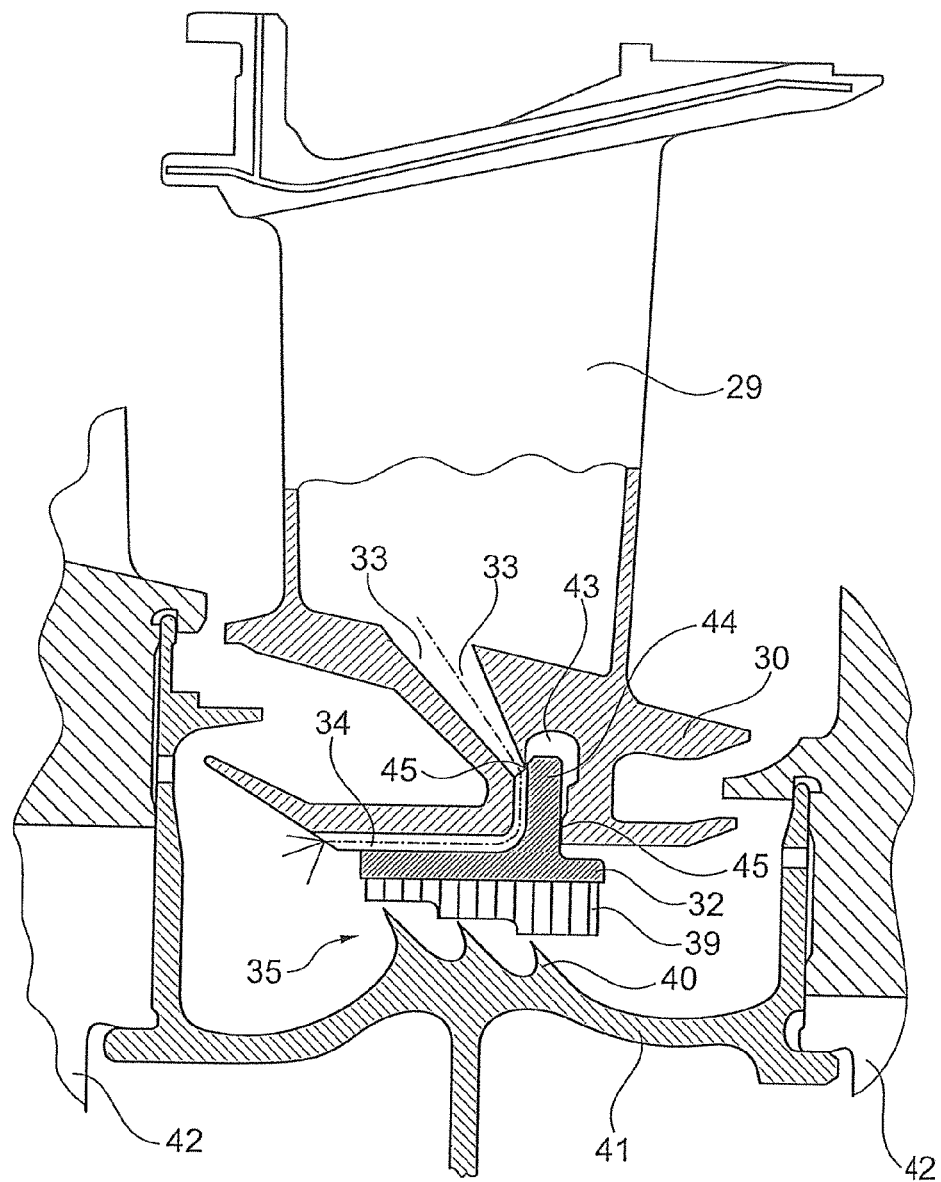
Figure 3:
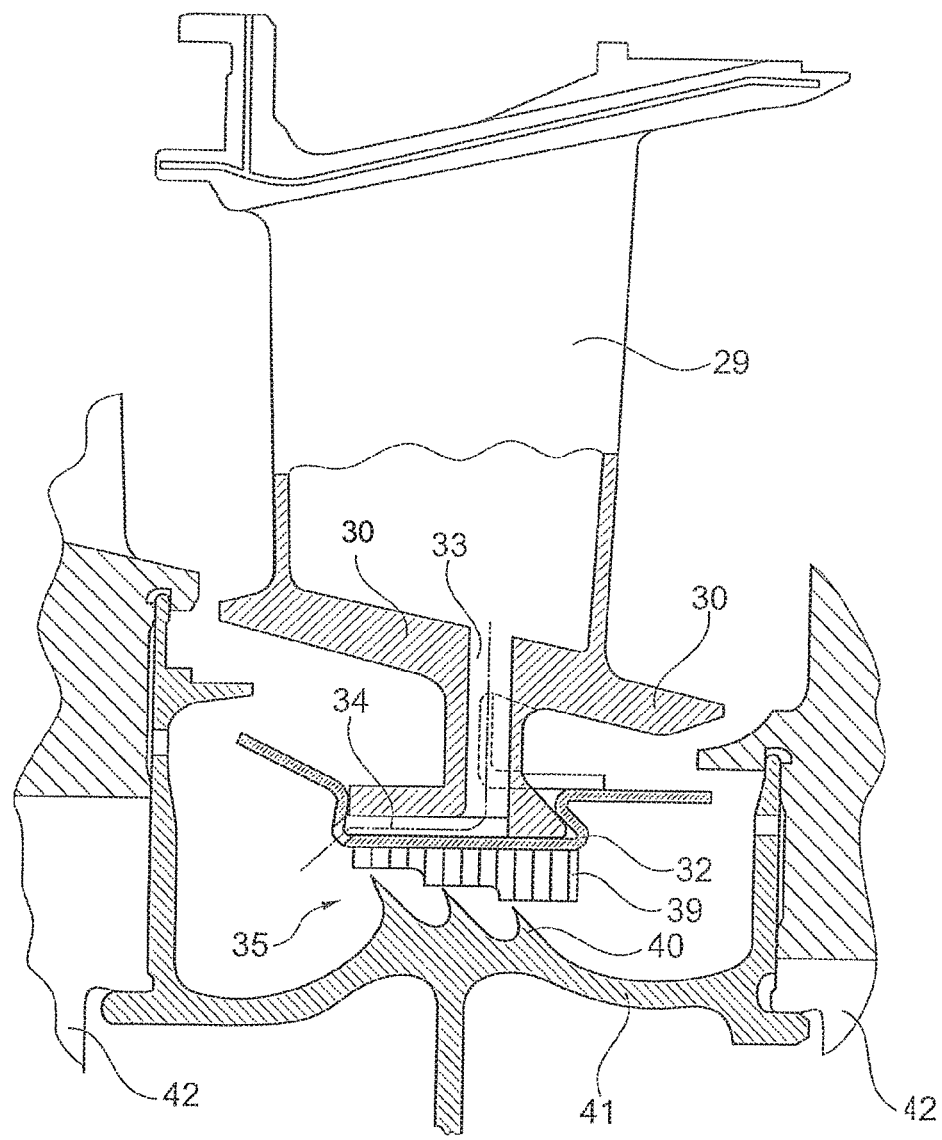
Figure 4:
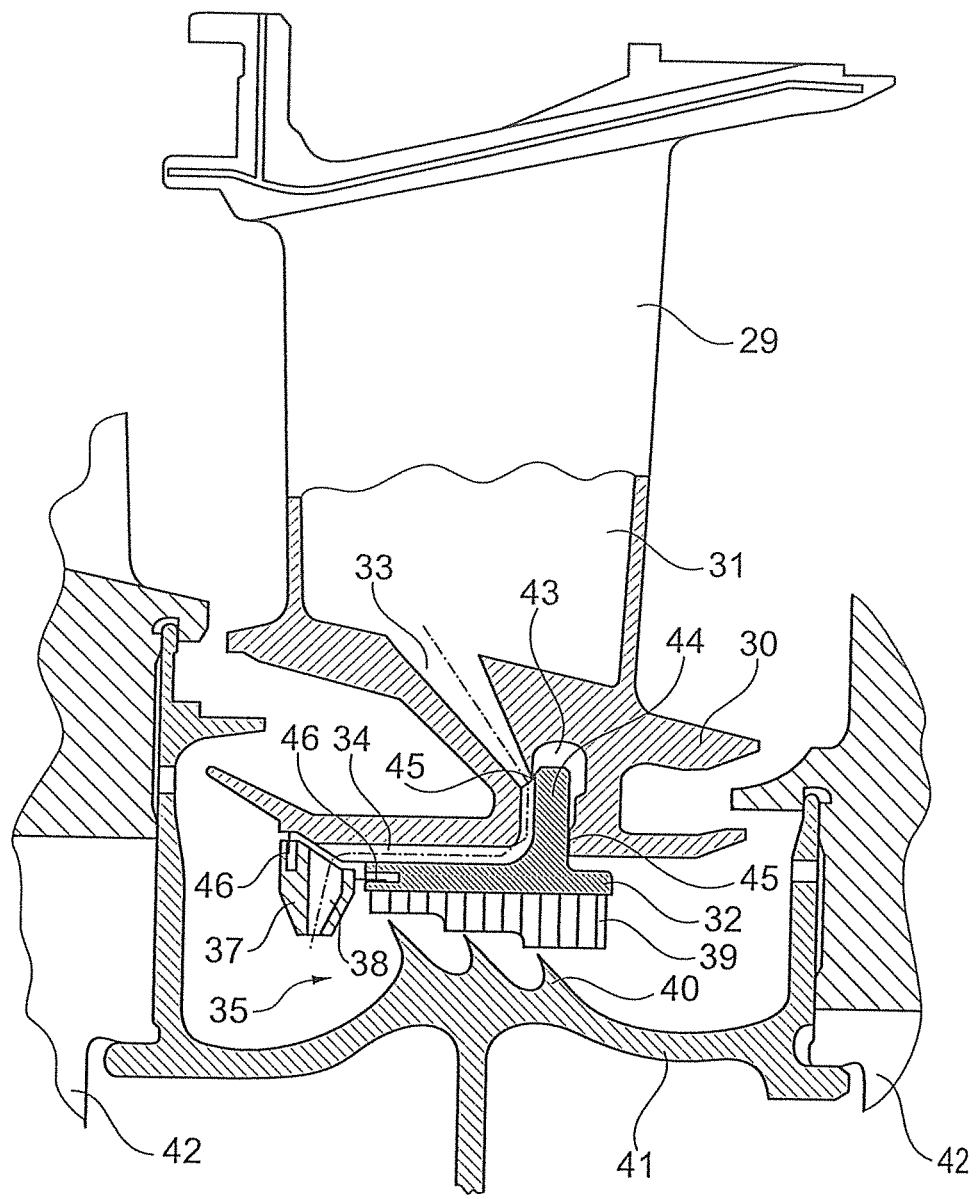
Figure 5:
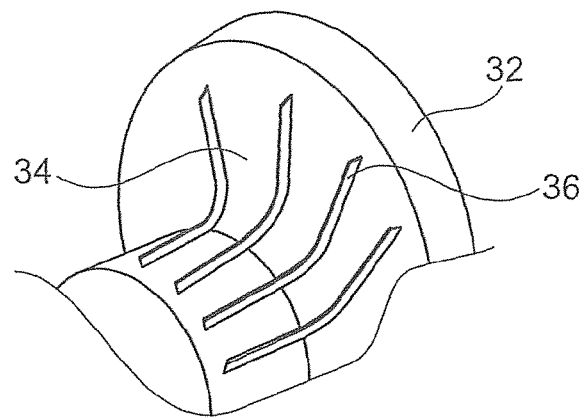
Figure 6:
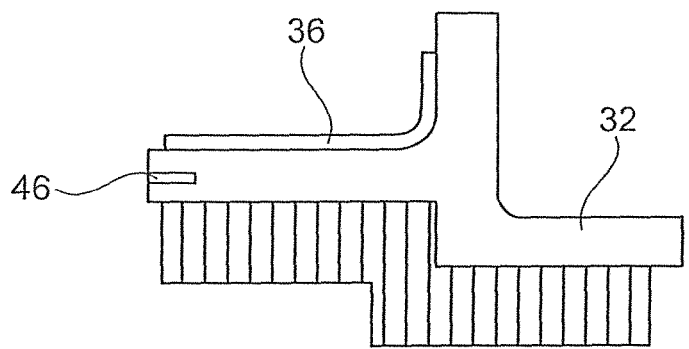
Figure 7:
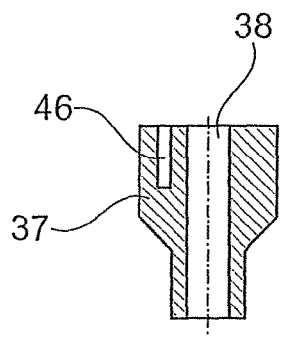
Figure 8:
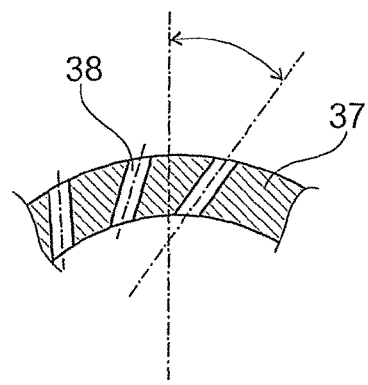

The present invention is described in the following in light of the accompanying drawing, showing, an exemplary embodiment. In the drawing, FIG. 1 shows a schematic representation of a gas-turbine engine in accordance with the present invention, FIG. 2 shows a partial sectional view of a first exemplary embodiment of the present invention, FIG. 3 shows a view, by analogy with FIG. 2, of a further exemplary embodiment of the present invention, FIG. 4 shows a view, by analogy with FIGS. 2 and 3, of a further exemplary embodiment of the present invention having an annular flow-guiding element, FIG. 5 shows a perspective partial view of a sealing element with ribs, FIG. 6 shows a sectional view of an exemplary embodiment of the sealing element with ribs, FIG. 7 shows a sectional view of an exemplary embodiment of a flow-guiding element, by analogy with FIG. 4, and FIG. 8 shows a partial sectional view of the flow-guiding element shown in FIG. 7.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes, generally referred to as stator vanes 20 and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIGS. 2 to 4 show various exemplary embodiments of the present invention. A stator vane 29 is shown here in schematic representation which includes a vane root 30. The stator vane 29 is designed hollow and has a vane interior 31 into which cooling air can be introduced. The cooling air flows here, in reference to FIGS. 2 to 4, against the radial direction from the outside to the inside. A single, singular outflow duct 33 is formed, for example by means of a casting method, in the vane root 30. The outflow duct 33 can be designed nozzle-like, as shown in the exemplary embodiments of FIGS. 2 and 4.

An annular or ring segment-shaped sealing element 32 is mounted on the vane root 30 and is provided, in order to form an inter-stage seal 35, with a honeycomb layer 39 against which rubbing lips 40 are directed in a manner known from the state of the art. The rubbing lips 40 are connected in one piece to a sealing ring 41 which is connected to adjacent rotor disks 42.

In the exemplary embodiment shown in FIG. 2, the vane root 30 has a radially extending annular slot 43 which receives an annular web 44 of the annular sealing element 32. It is understood that the term "annular" in this connection in particular covers ring segments too. An annular space 34 is formed between the annular web 44 and the vane root 30, through which annular space the cooling air can flow out of the outflow duct 33, as shown in FIG. 2.

In the exemplary embodiment shown in FIG. 3, the annular sealing element 32 (ring segment) is designed from a sheet metal-like material and engages positively with the vane root 30. Here too, cooling air flows through the radial outflow duct 33 into the annular space 34 extending substantially in the axial direction, in order to be supplied afterwards to a cavity of the inter-stage seal 35.

The exemplary embodiment shown in FIG. 4 corresponds substantially to the exemplary embodiment of FIG. 2. Additionally, an annular or ring segment-shaped flow-guiding element 37 is provided which has a passage duct 38. The flow-guiding element 37 is used to guide the cooling air exiting the annular space 34 in the radial direction and/or in the circumferential direction or also in the axial direction.

FIG. 7 shows a sectional view of a further exemplary embodiment of a flow-guiding element 37, while FIG. 8 shows a sectional view from which it can be seen that the passage ducts 38 can be arranged inclined in order to apply a swirl effect in the circumferential direction.

FIGS. 5 and 6 show ribs 36 which are provided on the annular sealing element 32, firstly to ensure a clearance from the vane root 30 and thus create the annular space 34, and secondly to guide the cooling air in the axial direction and suppress any movement in the circumferential direction.

It is preferably provided, in particular in the exemplary embodiments of FIGS. 2 and 4, that a sealing contact 45 is assured between the vane root 30 and the annular web 44, preventing any cooling air leakage. The reference numeral 46 in FIGS. 4, 6 and 7 indicates seals, for example sheet metal-type strip seals, which seal off the flow-guiding element 37 from the vane root and/or the annular sealing element 32.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Stator vanes
21 Engine casing
22 Compressor rotor blades
23 Stator vanes
24 Turbine blades
26 Compressor drum or disk
27 Turbine rotor hub
28 Exhaust cone
29 Stator vane
30 Vane root
31 Vane interior
32 Ring-shaped sealing element
33 Outflow duct
34 Annular space
35 Inter-stage seal
36 Rib
37 Flow-guiding element
38 Passage duct
39 Honeycomb layer
40 Rubbing lip
41 Sealing ring
42 Rotor disk
43 Annular slot
44 Annular web
45 Sealing contact
46 Seal

What is claimed is:

1. A gas turbine comprising:
a turbine stator wheel, including a plurality of stator vanes and a ring segment-shaped vane root, the stator vanes being hollow and each including a vane interior which can be supplied with cooling air,
a ring-shaped sealing element of an inter-stage seal arranged radially inwardly, relative to an engine axis, of the vane root,
at least one outflow duct positioned in the vane root and connected to the vane interior to output the cooling air from the vane interior,
an annular space formed between the vane root and the sealing element and extending substantially in an axial direction,
the at least one outflow duct issuing the cooling air into the annular space and the annular space discharging the cooling air into an area of the inter-stage seal,
a plurality of axially extending ribs positioned in the annular space and extending from the at least one outflow duct through an exit opening of the annular towards area of the inter-stage seal, the ribs spacing apart the sealing element from the vane root and limiting circumferential cooling air flow in the annular space.

2. The gas turbine in accordance with claim 1, wherein the annular space has a constant flow cross-section from the at least one outflow duct through an exit opening of the annular space into the area of the inter-stage seal.

3. The gas turbine in accordance with claim 1, wherein the ribs are arranged on the sealing element.

4. The gas turbine in accordance with claim 1, wherein a discharge area of the annular space provides for axial outflow of the cooling air.

5. The gas turbine in accordance with claim 1, wherein a discharge area of the annular space provides for outflow of the cooling air at an angle relative to at least one chosen from the axial direction and a radial direction.

6. The gas turbine in accordance with claim 1, and further comprising an annular flow-guiding element at a discharge area of the annular space.

7. The gas turbine in accordance with claim 6, wherein the flow-guiding element includes passage ducts.

8. The gas turbine in accordance with claim 7, wherein the passage ducts are inclined relative to at least one chosen from a radial direction and the axial direction.

9. The gas turbine in accordance with claim 1, wherein the at least one outflow duct is inclined relative to at least one chosen from a radial direction and the axial direction.

10. The gas turbine in accordance with claim 1, wherein the ribs include predominately radially extending portions adjoining predominately axially extending portions, the predominately radially extending portions positioned directly adjacent the at least one outflow duct upstream of the predominately axially extending portions which are positioned directly adjacent the exit opening of the annular towards area of the inter-stage seal.

11. The gas turbine in accordance with claim 10, wherein the ribs include curved portions connecting the predominately radially extending portions to the predominately axially extending portions.

12. A gas turbine comprising:
a turbine stator wheel, including a plurality of stator vanes and a ring segment-shaped vane root, the stator vanes being hollow and each including a vane interior which can be supplied with cooling air,
a ring-shaped sealing element of an inter-stage seal arranged radially inwardly, relative to an engine axis, of the vane root,
at least one outflow duct positioned in the vane root and connected to the vane interior to output the cooling air from the vane interior,
an annular space formed between the vane root and the sealing element and extending substantially in an axial direction,
the at least one outflow duct issuing the cooling air into the annular space and the annular space discharging the cooling air into an area of the inter-stage seal,
wherein the annular space has a constant flow cross-section from the at least one outflow duct through an exit opening of the annular space into the area of the inter-stage seal.

13. The gas turbine in accordance with claim 12, wherein a discharge area of the annular space provides for axial outflow of the cooling air.

14. The gas turbine in accordance with claim 12, wherein a discharge area of the annular space provides for outflow of the cooling air at an angle relative to at least one chosen from the axial direction and a radial direction.

15. The gas turbine in accordance with claim 12, and further comprising an annular flow-guiding element at a discharge area of the annular space.

16. The gas turbine in accordance with claim 15, wherein the flow-guiding element includes passage ducts.

17. The gas turbine in accordance with claim 16, wherein the passage ducts are inclined relative to at least one chosen from a radial direction and the axial direction.

18. The gas turbine in accordance with claim 12, wherein the at least one outflow duct is inclined relative to at least one chosen from a radial direction and the axial direction.

* * * * *